(12) United States Patent
Dawson et al.

(10) Patent No.: US 9,406,335 B2
(45) Date of Patent: Aug. 2, 2016

(54) MONITORING OF RESIDUAL ENCRYPTED DATA TO IMPROVE ERASE PERFORMANCE ON A MAGNETIC MEDIUM

(71) Applicant: International Business Machines Corporation, Armonk, NY (US)

(72) Inventors: Erika M. Dawson, Tucson, AZ (US); Scott M. Fry, Oro Valley, AZ (US); Paul M. Greco, Tucson, AZ (US); Gavin S. Johnson, San Jose, CA (US); Joel K. Lyman, Tucson, AZ (US); Jon A. Lynds, San Jose, CA (US); Cory G. Smith, Mesa, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/642,669

(22) Filed: Mar. 9, 2015

(65) Prior Publication Data
US 2015/0187383 A1    Jul. 2, 2015

Related U.S. Application Data

(63) Continuation of application No. 13/551,513, filed on Jul. 17, 2012, now Pat. No. 8,995,071.

(51) Int. Cl.
*G11B 20/00* (2006.01)
*G11B 5/008* (2006.01)
(Continued)

(52) U.S. Cl.
CPC ........ *G11B 20/0021* (2013.01); *G06F 12/1408* (2013.01); *G11B 5/00821* (2013.01);
(Continued)

(58) Field of Classification Search
CPC .................................................... G11B 20/0021
See application file for complete search history.

(56) References Cited

U.S. PATENT DOCUMENTS

| 4,939,598 | A  | 7/1990 | Kulakowski et al. |
| 7,359,848 | B1 | 4/2008 | Nourmohamadian et al. |

(Continued)

FOREIGN PATENT DOCUMENTS

| EP | 557552 A1 | 9/1993 |
| EP | 0936618 A2 | 8/1999 |

(Continued)

OTHER PUBLICATIONS

IBM, "Fast Secure Erase method using Multi-Key Encryption for Logically-virtualized Data wihtout overwriting whole Physical Tape," IP.com, IPCOM000189491D, Nov. 12, 2009, pp. 1-5.

(Continued)

*Primary Examiner* — Paul Huber
(74) *Attorney, Agent, or Firm* — Zilka-Kotab, PC

(57) ABSTRACT

In one embodiment, a system includes a processor and logic integrated with and/or executable by the processor, the logic being configured to: determine a physical position on a magnetic medium that corresponds to an end of an encrypted data set; store an indicator of the physical position on the magnetic medium and/or a memory coupled thereto; and cause obscuring of an unencrypted data set positioned after the physical position without overwriting the encrypted data set. In another embodiment, a computer program product includes a computer readable storage medium and program instructions embodied therewith, the program instructions readable and/ or executable by the processor to cause the processor to: read an indicator of a physical position on a magnetic medium that corresponds to an end of an encrypted data set; and cause obscuring of an unencrypted data set positioned after the physical position without overwriting the encrypted data set.

17 Claims, 13 Drawing Sheets

(51) Int. Cl.
  *G11B 5/024* (2006.01)
  *G11B 5/09* (2006.01)
  *G11B 27/031* (2006.01)
  *G11B 27/32* (2006.01)
  *G11B 27/11* (2006.01)
  *G11B 20/10* (2006.01)
  *G06F 12/14* (2006.01)

(52) U.S. Cl.
  CPC  *G11B5/024* (2013.01); *G11B 5/09* (2013.01); *G11B 20/10* (2013.01); *G11B 27/031* (2013.01); *G11B 27/11* (2013.01); *G11B 27/322* (2013.01); *G11B 2220/90* (2013.01)

(56) References Cited

U.S. PATENT DOCUMENTS

| | | |
|---|---|---|
| 7,899,612 B2 | 3/2011 | Kumagai et al. |
| 8,018,617 B2 | 9/2011 | Kortenoeven et al. |
| 8,799,612 B2 | 8/2014 | Dawson et al. |
| 8,995,071 B2 | 3/2015 | Dawson et al. |
| 2005/0078406 A1 | 4/2005 | Topham |
| 2009/0049310 A1 | 2/2009 | Carlson et al. |
| 2009/0049311 A1 | 2/2009 | Carlson et al. |
| 2010/0138619 A1 | 6/2010 | Benavides |
| 2011/0051277 A1 | 3/2011 | Bradshaw |
| 2013/0219034 A1 | 8/2013 | Wang et al. |
| 2014/0022663 A1 | 1/2014 | Dawson et al. |
| 2014/0025885 A1 | 1/2014 | Dawson et al. |

FOREIGN PATENT DOCUMENTS

| | | |
|---|---|---|
| EP | 001544736 A1 | 6/2005 |
| EP | 1830266 A1 | 9/2007 |
| JP | 064809 A | 1/1994 |
| WO | 2006062511 A1 | 6/2006 |

OTHER PUBLICATIONS

Wright et al., "Overwriting Hard Drive Data: The Great Wiping Controversy," Springer-Verlag Berlin Heidelberg, Dec. 2008, vol. 5352, pp. 243-257.

Non-Final Office Action from U.S. Appl. No. 13/551,513, dated Mar. 6, 2014.

Final Office Action from U.S. Appl. No. 13/551,513, dated Sep. 8, 2014.

Notice of Allowance from U.S. Appl. No. 13/551,513, dated Nov. 20, 2014.

Notice of Allowance from U.S. Appl. No. 13/551,512, dated Mar. 28, 2014.

Dawson, U.S. Appl. No. 13/551,512, filed Jul. 17, 2012.

Dawson, U.S. Appl. No. 13/551,513, filed Jul. 17, 2012.

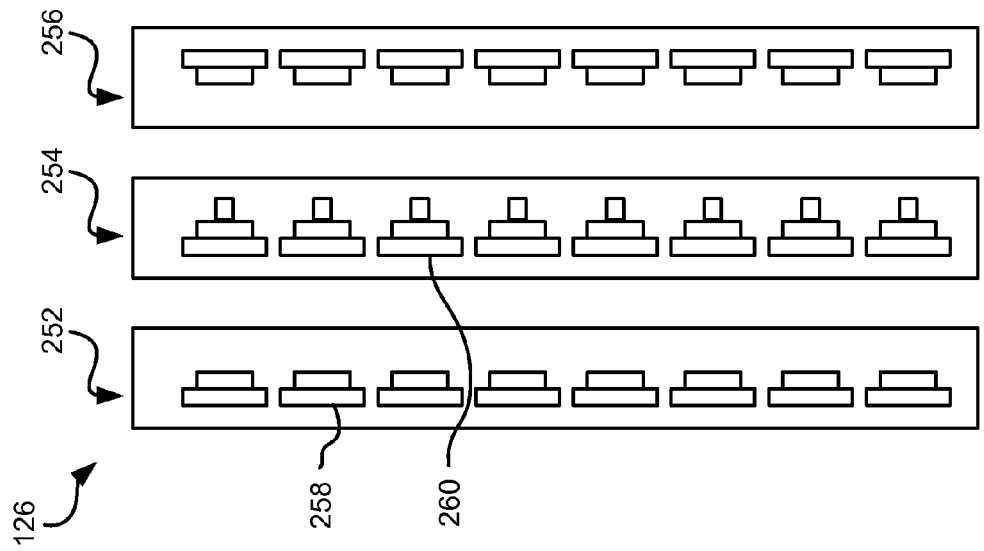
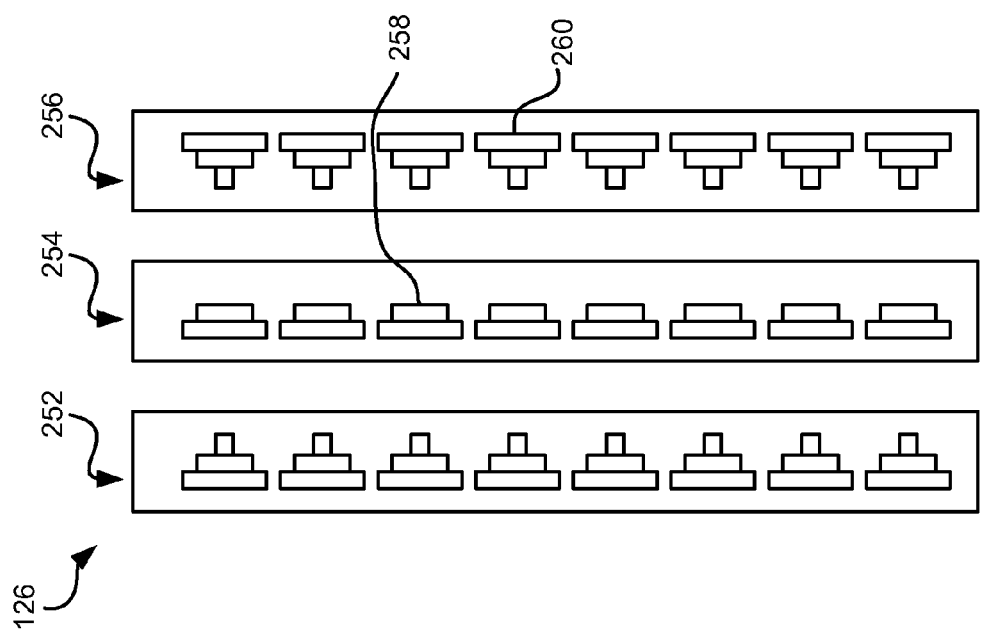

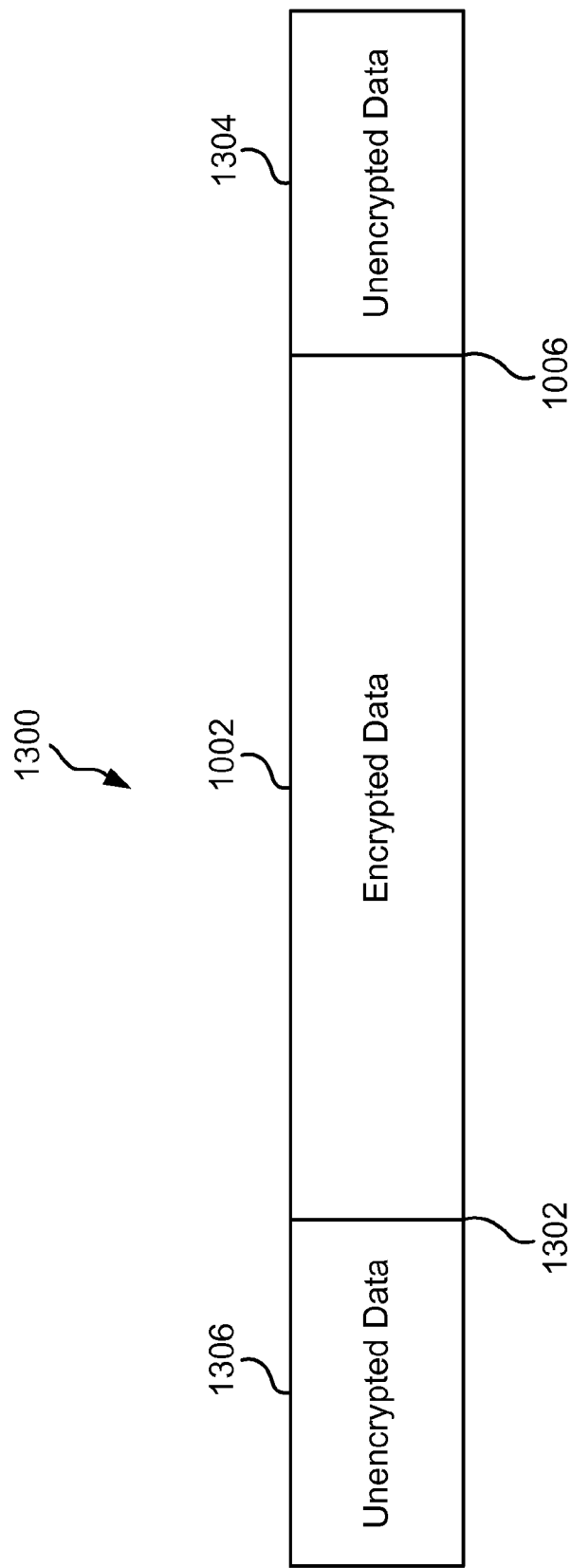

MONITORING OF RESIDUAL ENCRYPTED DATA TO IMPROVE ERASE PERFORMANCE ON A MAGNETIC MEDIUM

RELATED APPLICATIONS

This application is a continuation of U.S. patent application Ser. No. 13/551,513, filed Jul. 17, 2012, which is herein incorporated by reference.

BACKGROUND

The present invention relates to data storage systems, and more particularly, this invention relates to monitoring residual encrypted data to improve erase performance on a magnetic medium In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

BRIEF SUMMARY

In one embodiment, a system includes a processor and logic integrated with and/or executable by the processor, the logic being configured to: determine a first physical position on a magnetic medium that corresponds to an end of at least one encrypted data set; store an indicator of the first physical position on at least one of the magnetic medium and a memory coupled thereto; and cause obscuring of at least one unencrypted data set positioned after the first physical position without overwriting the encrypted data set.

In another embodiment, a method includes: determining a first physical position on a magnetic medium that corresponds to an end of at least one encrypted data set; determining a second physical position on the magnetic medium that corresponds to a beginning of the encrypted data set; storing an indicator of the first physical position and an indicator of the second physical position on at least one of the magnetic medium and a memory coupled thereto; and causing obscuring of at least one unencrypted data set positioned after the first physical position and/or before the second physical position without overwriting the encrypted data set.

In yet another embodiment, a system includes a processor and logic integrated with and/or executable by the processor, the logic being configured to: read an indicator of a first physical position on a magnetic medium that corresponds to an end of an encrypted data set; and cause obscuring of at least one unencrypted data set positioned after the first physical position without overwriting the encrypted data set.

In a further embodiment, a method includes: reading an indicator of a first physical position on a magnetic medium that corresponds to an end of an encrypted data set; and causing obscuring of at least one unencrypted data set positioned after the first physical position without overwriting the encrypted data set.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 13 is a schematic representation of data on a magnetic medium according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a system includes a processor, logic in the processor and/or memory configured to determine a physical position on a magnetic medium that corresponds to an end of encrypted data written over residual unencrypted data, and logic configured to store an indicator of the physical position on at least one of the magnetic medium and a memory coupled thereto.

In another general embodiment, a method includes determining a physical position on a magnetic medium that corresponds to an end of encrypted data written over residual unencrypted data, storing an indicator of the physical position on at least one of the magnetic medium and a memory coupled thereto.

In yet another general embodiment, a system includes a processor, logic in the processor and/or a memory configured to receive an instruction to obscure data on a magnetic medium, logic configured to read an indicator of a physical position on the magnetic medium that corresponds to an end of encrypted data written over residual unencrypted data, wherein the indicator is retrieved from at least one of the magnetic medium and a memory coupled to the magnetic medium; logic configured to issue an instruction to pass over the encrypted data without overwriting the encrypted data, and logic configured to cause obscuring of the residual unencrypted data positioned after the physical location.

According to another general embodiment, a method includes receiving an instruction to obscure data on a magnetic medium, reading an indicator of a physical position on the magnetic medium that corresponds to an end of encrypted data written over residual unencrypted data, wherein the indicator is read from at least one of the magnetic medium and a memory coupled to the magnetic medium, issuing an instruction to pass over the encrypted data without overwriting the encrypted data, and causing obscuring of the residual unencrypted data positioned after the physical location.

Figure 1A:
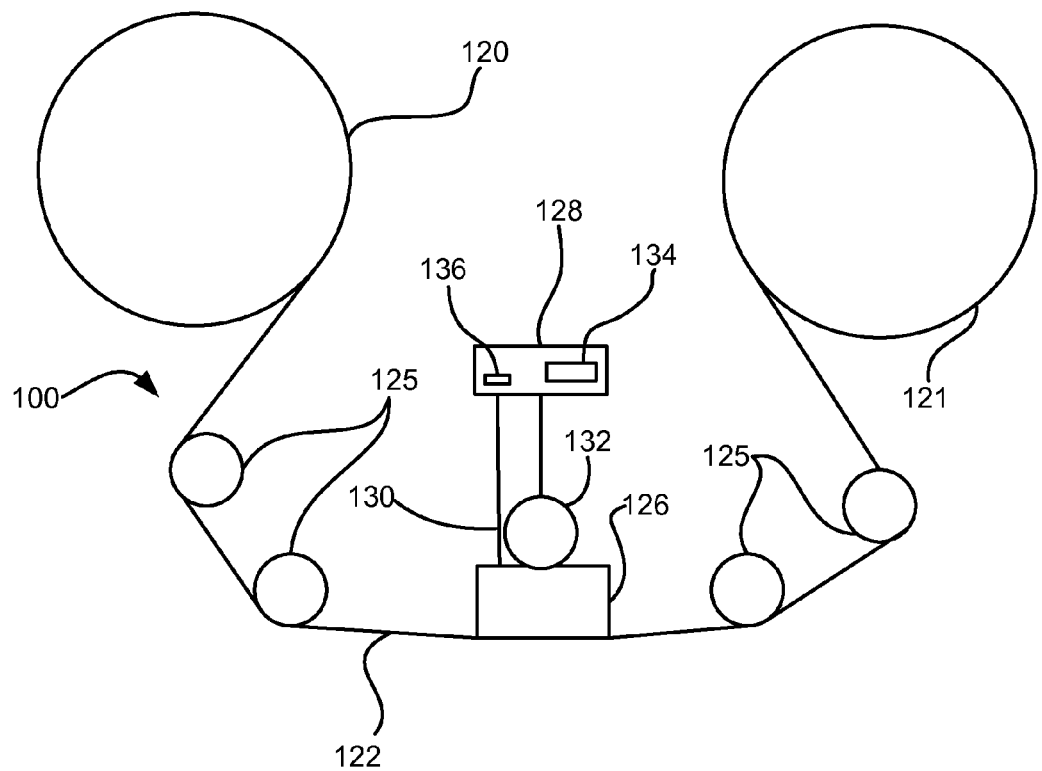
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128, which may be or include a processor, typically controls head functions such as servo following, writing, reading, etc. The controller 128 may operate under logic known in the art, as well as any logic disclosed herein. The controller 128 may be coupled to a memory 136 of any known type. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
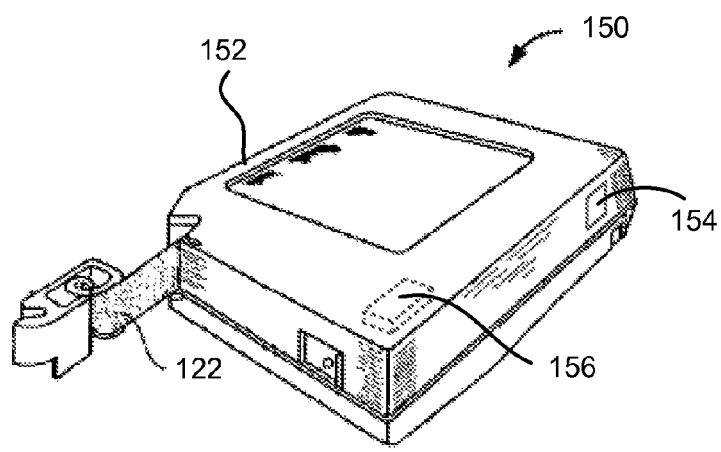
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
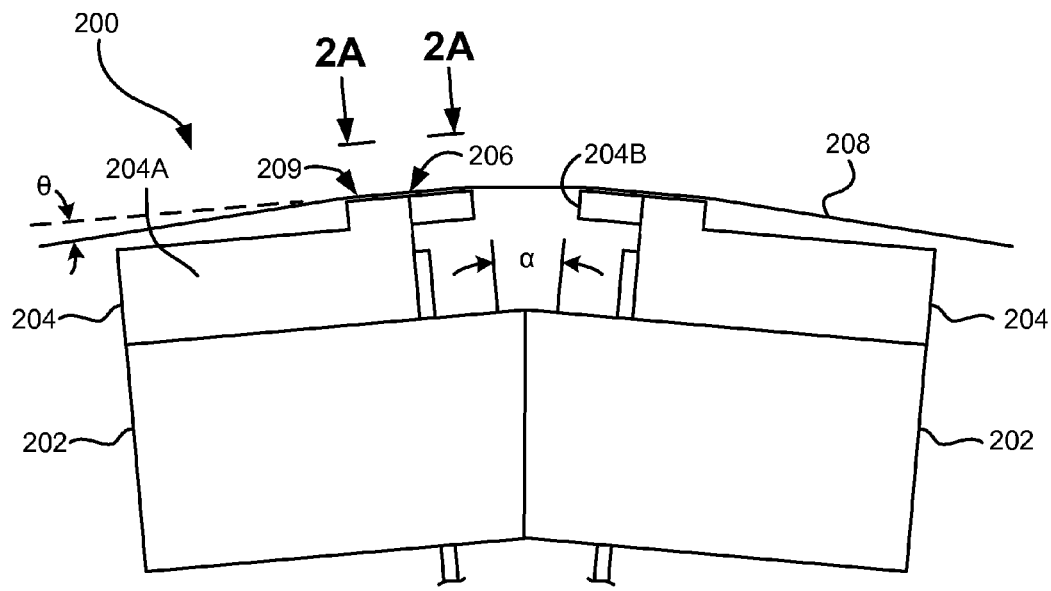
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
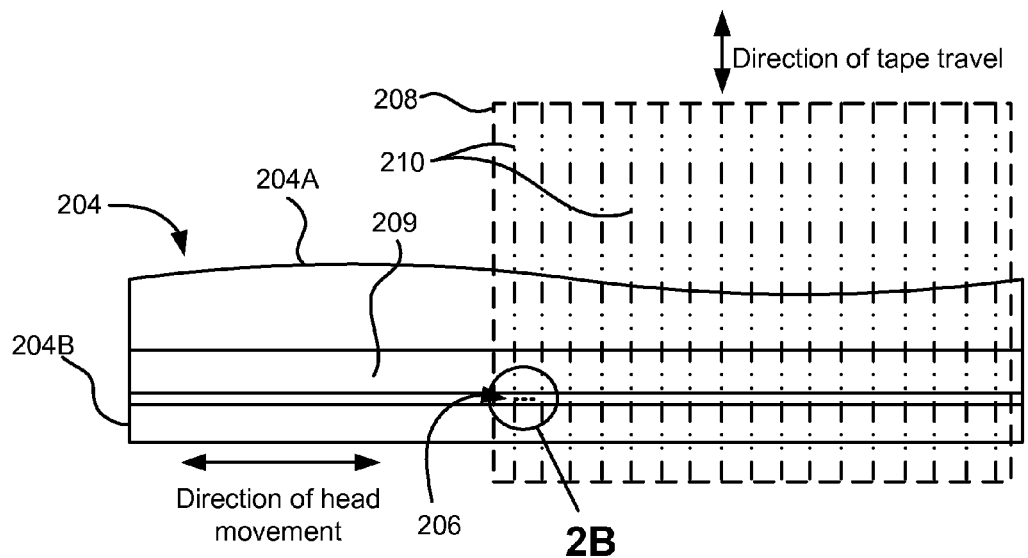
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
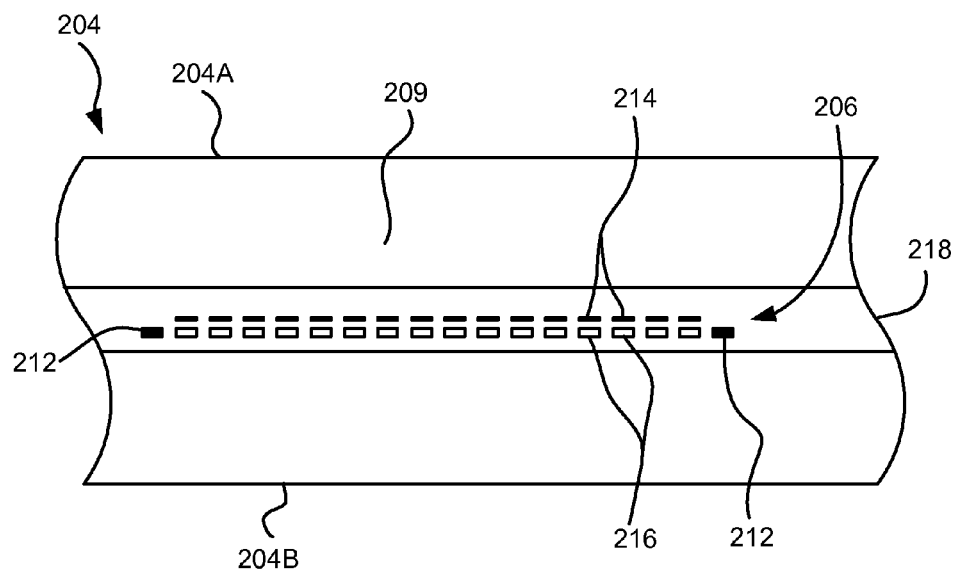
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
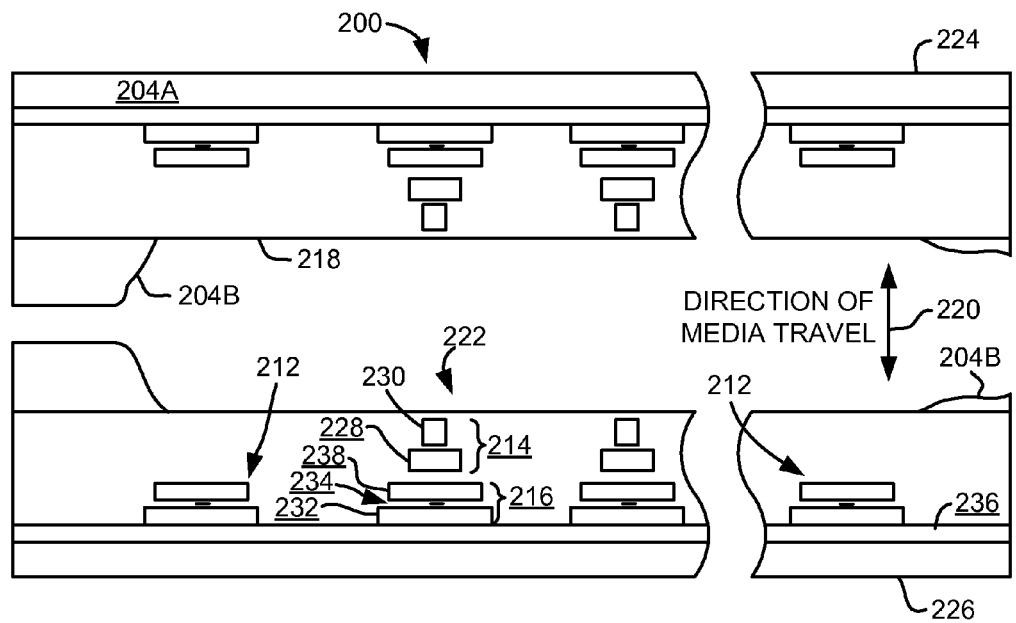
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
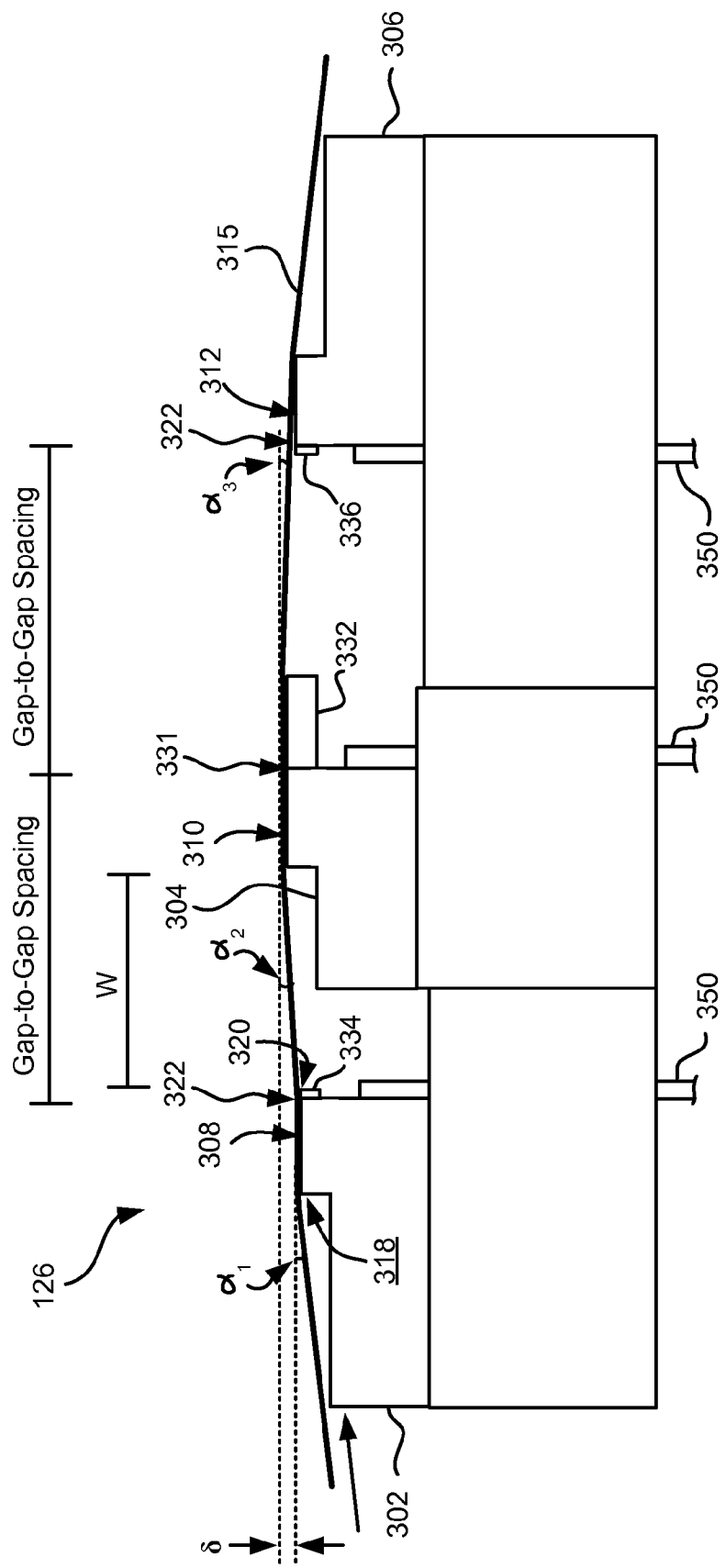
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
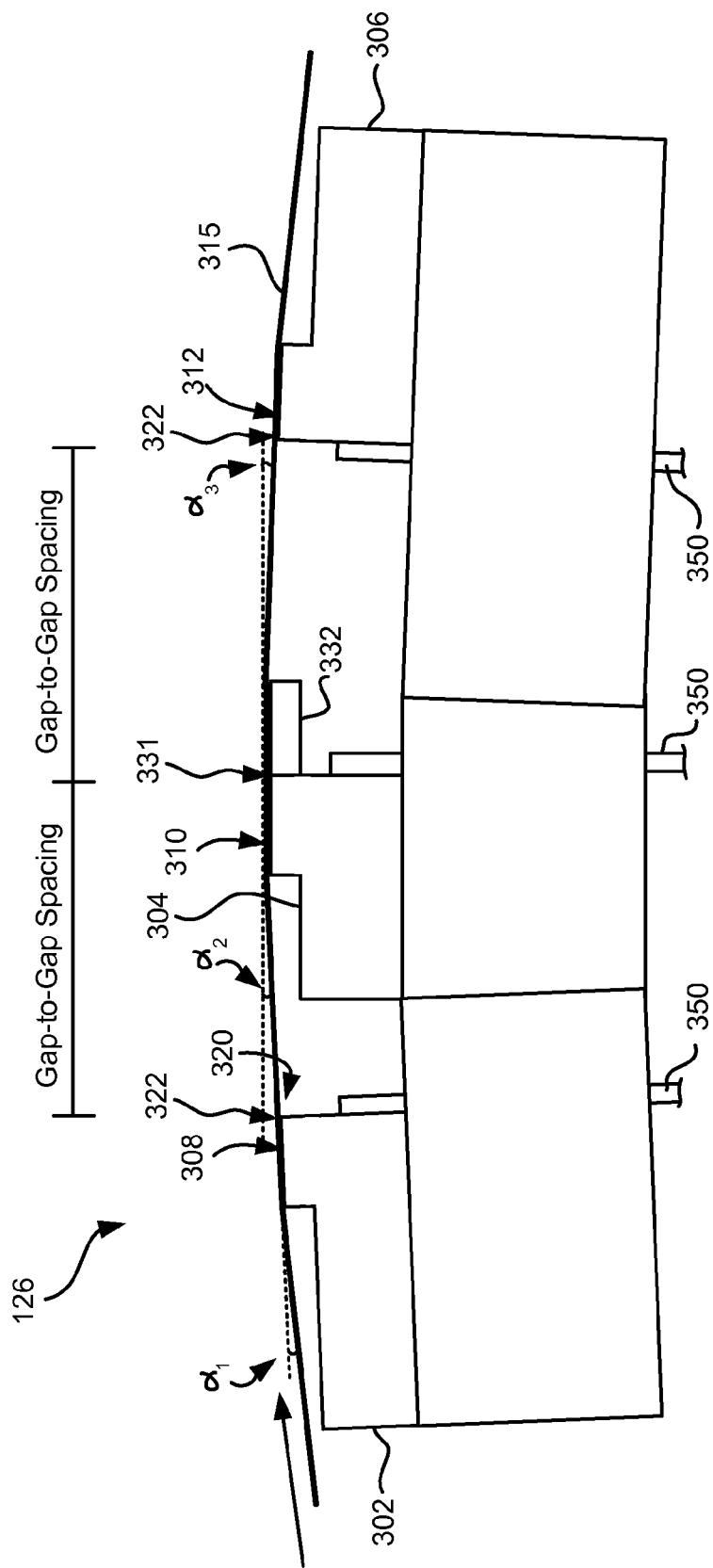
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}$ ($\delta$/W) where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
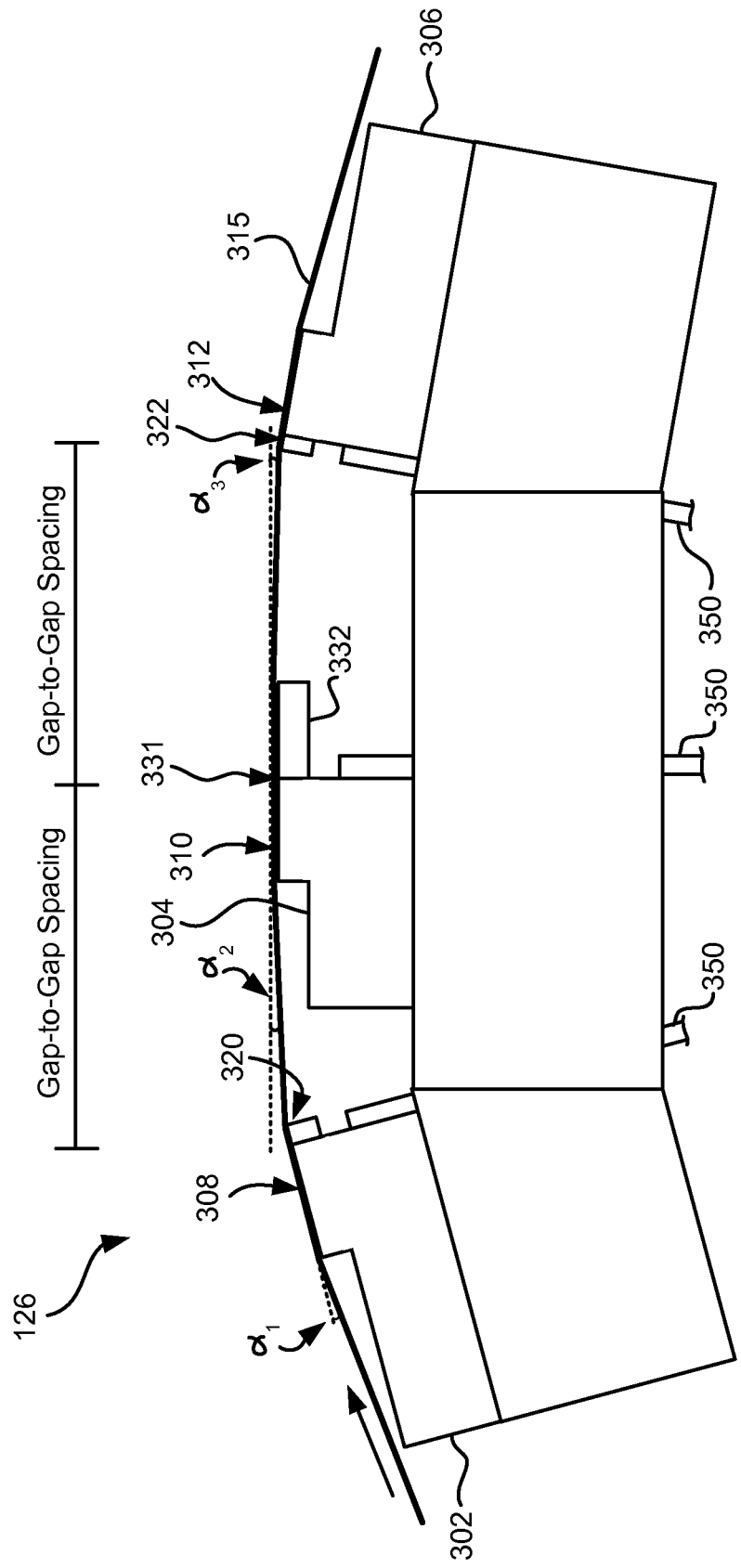
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

In conventional magnetic storage systems, securely erasing a magnetic medium, such as a tape cartridge, generally requires overwriting the entire volume to obscure the data. For example, if the magnetic medium is written in an encrypted format, the data can be obscured by destroying the associated data keys. However, this does not destroy any residual data that may be in encrypted or unencrypted format, and may still be on the physical medium from previous usages. In addition to destroying the data keys, some applications also choose to obscure the section of physical tape from the end of their user data to the end of the physical tape. This ensures that any residual data from previous tape usages are not exposed. However, this can potentially add hours to the process of erasing the tape.

Embodiments of the present invention overcome the aforementioned drawback by providing a system and method to record the location of residual encrypted data on a magnetic medium. When an encrypted magnetic medium is reused for writing new data, the data keys for the former usage may be destroyed. Therefore, any residual data that was in an encrypted format may already be obscured. Preferably, a system and/or method is able to record the location of the encrypted residual data, such that an application may specify that the erase command skip overwriting this data. If a volume of the magnetic medium is always used for encrypted data, such a system and/or method may save a large amount of time during the erase procedure.

Figure 8:
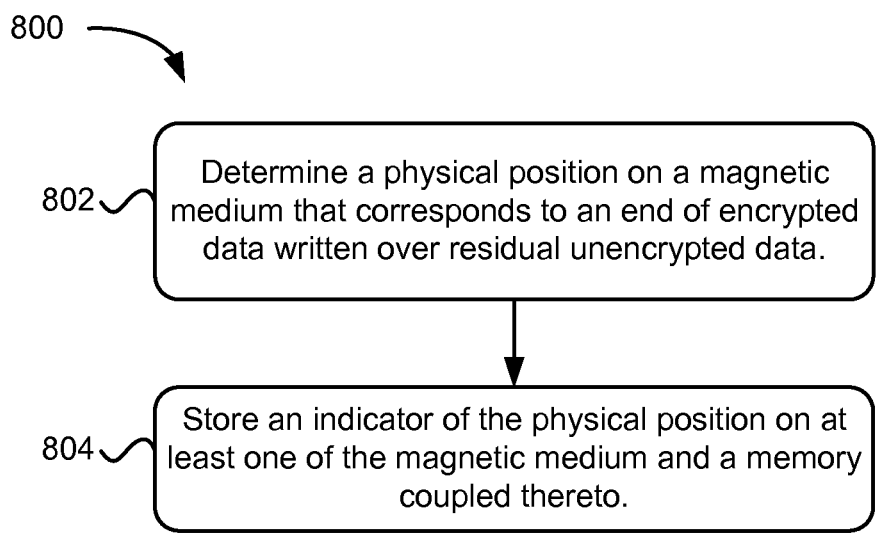
FIG. 8 is a flow diagram of a method according to one embodiment.

FIG. 8 shows a method 800 for monitoring encrypted residual data according to one illustrative embodiment. As an option, the present method 800 may be implemented in conjunction with features from any other embodiments listed herein, such as those shown in the other FIGS. Of course, however, this method 800 and others presented herein may be used in various applications and/or permutations, which may or may not be related to the illustrative embodiments listed herein. Further, the method 800 presented herein may be carried out in any desired environment. Moreover, more or less operations than those shown in FIG. 8 may be included in method 800, according to various embodiments.

As shown in FIG. 8 according to one approach, the method 800 includes determining a physical position on a magnetic medium that corresponds to an end of encrypted data written over residual unencrypted data. See operation 802. The method 800 may be performed, at least in part, by a system. As used herein, a system may include, but is not limited to, a tape drive controller, a tape drive or other type of drive, a tape library controller, a host, etc. Additionally, a magnetic medium as used herein may include, but is not limited to, magnetic tape or other sequential medium of a type known in the art.

In one embodiment, the physical position on the magnetic medium may correspond to the beginning of an un-overwritten portion of the unencrypted data adjacent to the end of the encrypted data.

In another embodiment, the physical position may correspond to the end of residual encrypted data. In yet another embodiment, the physical position may correspond to the beginning of the un-overwritten portion of the unencrypted data adjacent to the end of the residual encrypted data.

The method 800 also includes storing an indicator of the physical position on at least one of the magnetic medium and a memory coupled thereto, as shown in FIG. 8 according to one approach. See operation 804. As discussed herein, the indicator of the physical position may be stored in a header, in a reserved area on the magnetic medium, in nonvolatile cartridge memory coupled to a cartridge housing a magnetic tape, etc., or other such suitable location as would be understood by one skilled in the art upon reading the present disclosure.

In one embodiment, the indicator of the physical position may not be extremely precise, but may preferably point to a position on the same set of data tracks and within 25 feet or less of the actual physical location of the end of the unobscured data, where the unobscured data may include a string of bits, a volume or set of volumes, a block or set of blocks, etc. and combinations thereof. Thus, the physical positions indicated by the indicator may be approximate, but may nonetheless be close to the actual physical positions where the last bits of unobscured data reside on the medium.

In another embodiment, the method 800 may include causing obscuring of unencrypted data positioned after the physical position, and not overwriting of the encrypted data. In one approach, the obscuring may include overwriting the unobscured data. As used herein, the overwriting may include, but is not limited to, writing, one or more times, of a predetermined or random pattern, an AC erase, a DC erase, etc. and combinations thereof.

In yet another embodiment, the method 800 may include causing obscuring and/or disablement of decryption data associated with the encrypted data. As used herein, decryption data may include, but are not limited to, a key, a password, etc. or other decryption data that would be understood by one skilled in the art upon reading the present disclosure.

Some embodiments support the ability to interrupt and cancel the erase process in the middle of obscuring data. Since this process is typically associated with a physical device position rather than a logical block, one approach provides the ability to resume the erase process where it left off when it was canceled, thereby allowing the application to reposition the medium and start the erase process from the beginning.

Accordingly, in one approach, the method 800 may include canceling the obscuring prior to reaching the physical position in the indicator, and storing a second indicator, on at least one of the magnetic medium and the memory coupled thereto, of the last physical position that was obscured. In the event that the erase process is resubmitted, such an approach may allow the magnetic storage system to move to the physical position where it left off, e.g. the last physical position that was obscured, and start obscuring data from that point forward.

In one embodiment, the method 800 may include determining a second physical position on the magnetic medium that corresponds to a beginning of the encrypted data written over residual unencrypted data, and storing a second indicator of the second physical position on at least one of the magnetic medium and the memory coupled thereto. In another embodiment, the second physical position on the magnetic medium may correspond to the end of the un-overwritten portion of the unencrypted data adjacent the beginning of the encrypted data.

In one approach, the residual unencrypted data may be part of the same data set as that discussed above. In another approach the residual unencrypted data may be a different unencrypted data set.

In yet another approach, the method 800 may include causing obscuring of the unencrypted data positioned before the second physical position and obscuring of the unencrypted data positioned after the physical position, and not overwriting of the encrypted data, according to one embodiment.

Additionally, in one embodiment, alternating usages of the magnetic medium may use encrypted and unencrypted formats such that the magnetic medium may have a plurality of alternating encrypted and unencrypted regions. Accordingly, in one approach, the method 800 may include determining a plurality of indicators of physical positions on the magnetic medium that correspond to a beginning of the encrypted data written over residual unencrypted (and/or encrypted) data and determining a plurality of indicators of physical positions on the magnetic medium that correspond to an end of the encrypted data written over residual unencrypted (and/or encrypted) data.

Generally, a system such as a tape drive, writes data back and forth in a plurality of tracks on the magnetic medium. Accordingly, in one embodiment, the method 800 may include recording whether or not the track consists entirely of encrypted data after each track is completed. Where a track is entirely of encrypted data, the method may include skipping (i.e. not overwriting) the encrypted track during the erase procedure.

Figure 9:
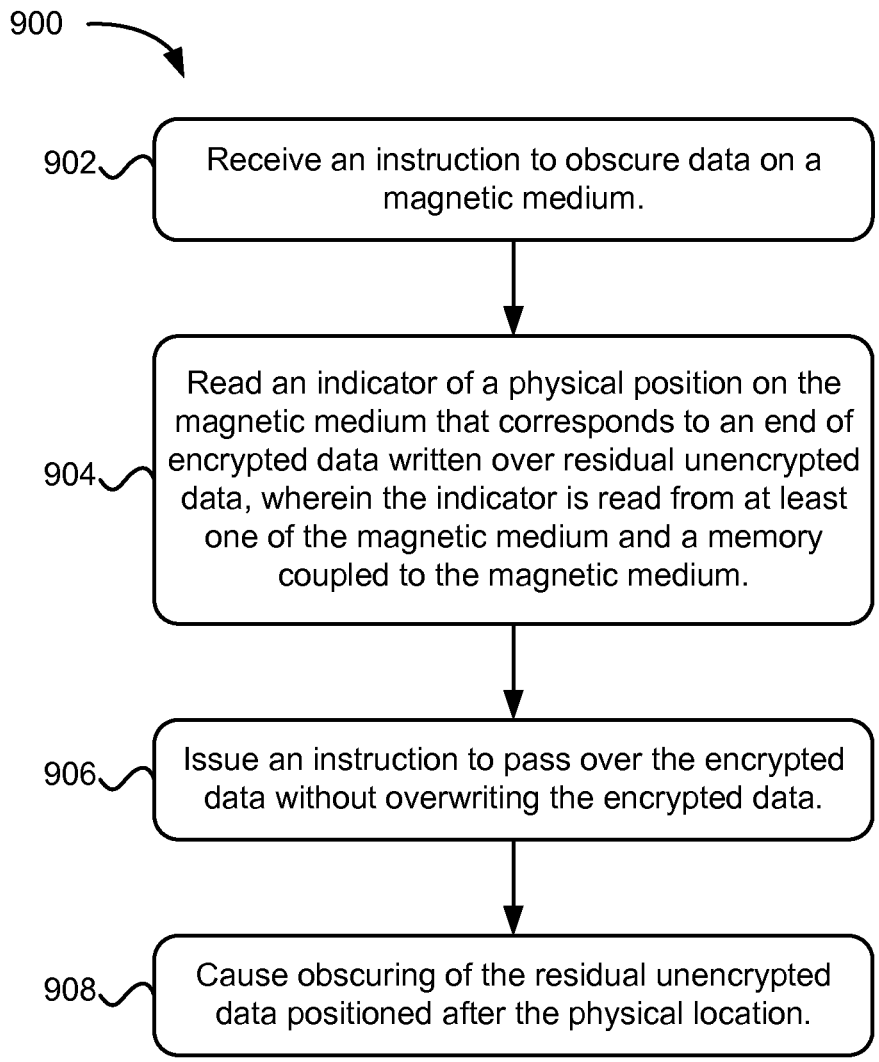
FIG. 9 is a flow diagram of a method according to one embodiment.

Referring now to FIG. 9, a method 900 for monitoring encrypted residual data is shown according to one illustrative embodiment. As an option, the present method 900 may be implemented in conjunction with features from any other embodiments listed herein, such as those shown in the other FIGS. Of course, however, this method 900 and others presented herein may be used in various applications and/or permutations, which may or may not be related to the illustrative embodiments listed herein. Further, the method 900 presented herein may be carried out in any desired environment. Moreover, more or less operations than those shown in FIG. 9 may be included in method 900, according to various embodiments.

As shown in FIG. 9 according to one approach, the method 900 includes receiving an instruction to obscure data on a magnetic medium. See operation 902. The method 900 may be performed at least in part by a system such as a tape drive controller, a tape drive, a tape library controller, a host, etc., or other suitable system as would be understood by one skilled in the art upon reading the present disclosure.

The method 900 also includes, according to another approach, reading an indicator of a physical position on the magnetic medium that corresponds to an end of encrypted data written over residual unencrypted data, wherein the indicator is read from at least one of the magnetic medium and a memory coupled to the magnetic medium. See operation 904.

In one embodiment, the indicator is retrieved via a magnetic reader, a memory reader, a reader local or external to the system, etc. or other suitable reader as would be understood by one skilled in the art upon reading the present disclosure.

In another embodiment, the physical position on the magnetic medium may correspond to the beginning of an un-overwritten portion of the unencrypted data adjacent to the end of the encrypted data.

In yet another embodiment, the physical position may correspond to the end of residual encrypted data. In yet a further embodiment, the physical position may correspond to the beginning of the un-overwritten portion of the unencrypted data adjacent to the end of the residual encrypted data.

Additionally, method 900 includes issuing an instruction to pass over the encrypted data without overwriting the encrypted data, as shown in operation 906 according to one approach. In another approach, the method 900 further includes causing obscuring of the residual unencrypted data positioned after the physical location. See operation 908.

In yet another approach, the obscuring may include overwriting the unobscured data. In another approach, the method 900 may include causing obscuring and/or disablement of decryption data associated with the encrypted data.

In one embodiment, the method 900 may include canceling the obscuring prior to reaching the physical position in the indicator, and storing a second indicator, on at least one of the magnetic medium and the memory coupled thereto, of the last physical position that was obscured. In the event that the erase process is resubmitted, such an embodiment may allow the magnetic storage system to move to the physical position where it left off, e.g. the last physical position that was obscured, and start obscuring data from that point forward.

In another embodiment, the method 900 may include determining a second physical position on the magnetic medium that corresponds to a beginning of the encrypted data written over residual unencrypted data, and storing a second indicator of the second physical position on at least one of the magnetic medium and the memory coupled thereto. In yet another embodiment, the second physical position on the magnetic medium may correspond to the end of the un-overwritten portion of the unencrypted data adjacent the beginning of the encrypted data.

In one approach, the residual unencrypted data may be part of the same data set as that discussed above. In yet another approach the residual unencrypted data may be a different unencrypted data set.

In another approach, the method 900 may include causing obscuring of the unencrypted data positioned before the second physical position and obscuring of the unencrypted data positioned after the physical position, and not overwriting of the encrypted data.

Additionally, in yet another embodiment, alternating usages of the magnetic medium may use encrypted and unencrypted formats such that the magnetic medium may have a plurality of alternating encrypted and unencrypted regions. Accordingly, in one approach, the method 900 may include determining a plurality of indicators of physical positions on the magnetic medium that correspond to a beginning of the encrypted data written over residual unencrypted (and/or encrypted) data and determining a plurality of indicators of physical positions on the magnetic medium that correspond to an end of the encrypted data written over residual unencrypted (and/or encrypted) data.

Generally, a system such as a tape drive, writes data back and forth in a plurality of tracks on the magnetic medium. Accordingly, in one embodiment, the method 900 may include recording whether or not the track consists entirely of encrypted data after each track is completed. Where a track is entirely of encrypted data, the method may include skipping (i.e. not overwriting) the encrypted track during the erase procedure.

Referring now to FIGS. 10-13, illustrative representations 1000-1300 of data on a data track of a magnetic medium are shown according to various illustrative embodiments. As an option, the present representations may be implemented in conjunction with features from any other embodiment listed herein, such as those described with reference to the other FIGS. Of course, however, such representations, and others presented herein, may be used in various applications and/or in permutations, which may or may not be specifically described in the illustrative embodiments listed herein.

Figure 10:
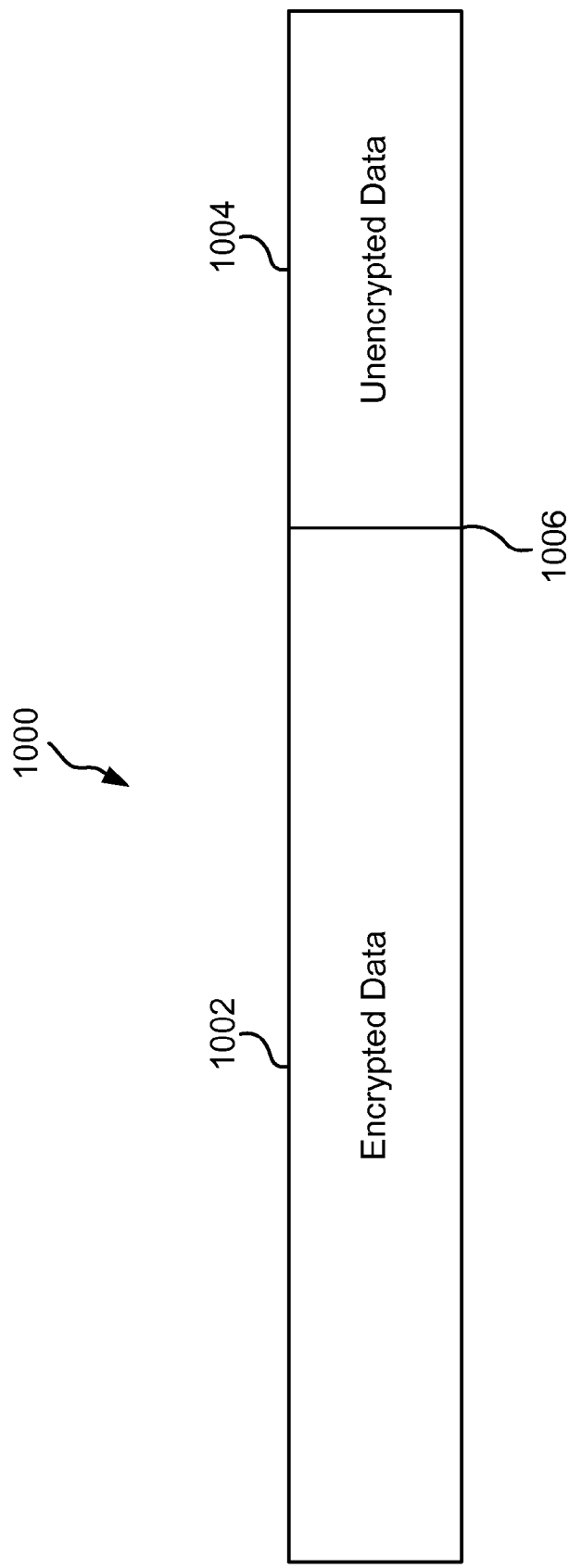
FIG. 10 is a schematic representation of data on a magnetic medium according to one embodiment.

As shown in FIG. 10 according to one approach, the data track may include encrypted data 1002 written over residual unencrypted data 1004. As noted above, an indicator of the physical position 1006 may be stored on at least one of the magnetic medium and a memory coupled thereto, according to another approach.

In one embodiment, the indicator of the physical position 1006 on the magnetic medium may correspond to the beginning of an un-overwritten portion of the unencrypted data 1004 adjacent to the end of the encrypted data 1002.

In another embodiment, the indicator of the physical position 1006 may be stored in a header, in a reserved area on the magnetic medium, in nonvolatile cartridge memory coupled to a cartridge housing a magnetic tape, etc. or other such suitable location as would be understood by one skilled in the art upon reading the present disclosure.

In yet another embodiment, the indicator of the physical position 1006 may not be extremely precise, but may point to a position on the same set of data tracks and within 25 feet or less of the actual physical location of the end of the unobscured data, where the unobscured data may include a string of bits, a volume or set of volumes, a block or set of blocks, etc. and combinations thereof. Thus, the physical positions indicated by the indicators described herein may be approximate, but may be nonetheless close to the actual physical positions where the last bits of unobscured data reside on the medium.

As noted above, the unencrypted data 1004 positioned after the physical position may be obscured via any known process, where the obscuring process does not overwrite the encrypted data 1002. In one approach, the obscuring may include overwriting the unobscured data. In another approach, the decryption data associated with the encrypted data 1002 may be obscured and/or disabled.

Figure 11:
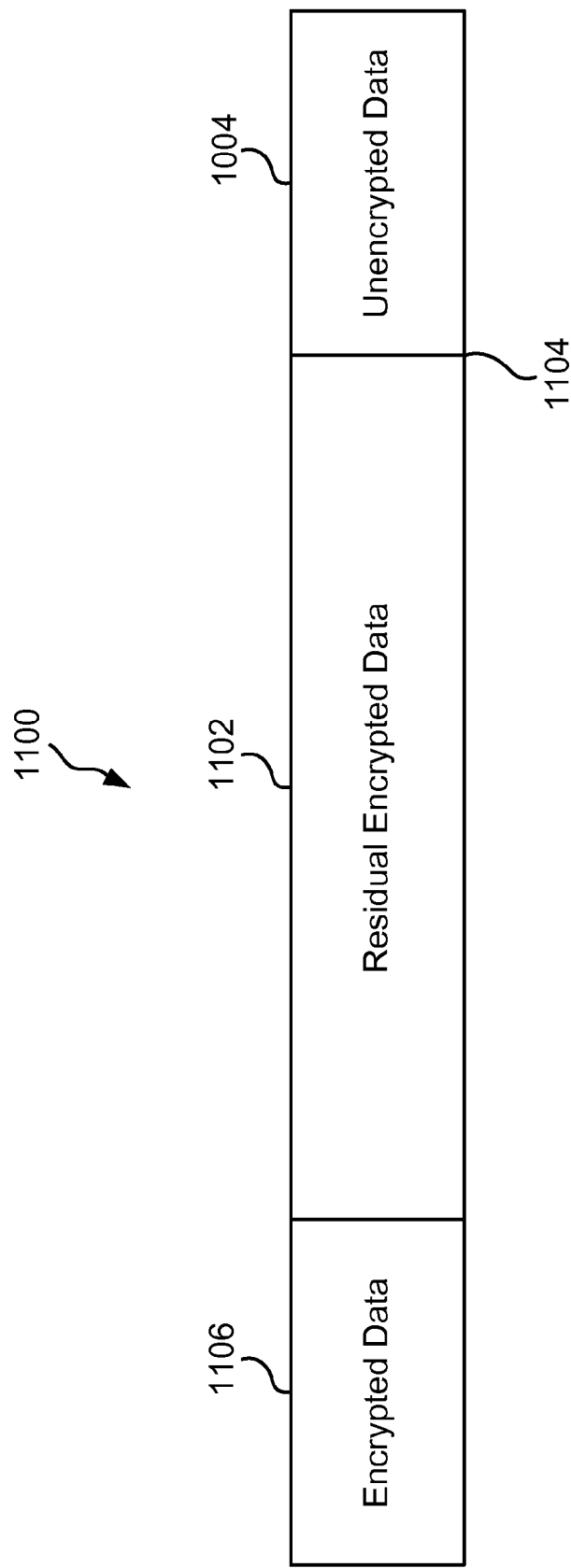
FIG. 11 is a schematic representation of data on a magnetic medium according to one embodiment.

According to another embodiment as shown in FIG. 11, the data track may include residual encrypted data 1102. In one approach, the indicator of the physical position 1104 on the data track may correspond to the end of the residual encrypted data 1102. In another approach, the indicator 1102 of the physical position may correspond to the beginning of the un-overwritten portion of the unencrypted data 1004 adjacent to the end of the residual encrypted data 1102.

In yet another approach, the residual encrypted data 1102 may be obscured when the tape is reused, such that the residual encrypted data 1102 need not be overwritten during an erase operation. For example, during an erase procedure, the residual encrypted data 1102 may not be overwritten, whereas the decryption data associated with the encrypted data 1106 may be disabled and/or obscured and the unencrypted data 1004 may be obscured, according to one embodiment.

Figure 12:
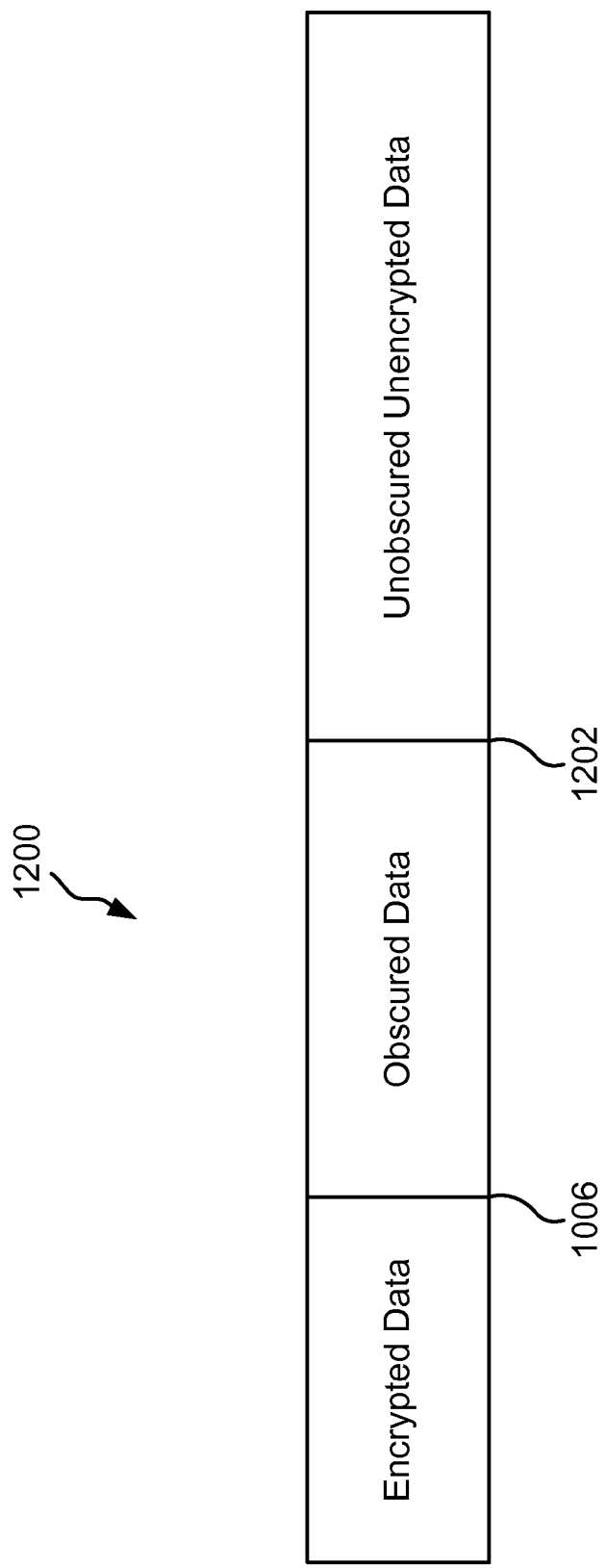
FIG. 12 is a schematic representation of data on a magnetic medium according to one embodiment.

As shown in FIG. 12 according to one approach, the data track may include a second indicator that corresponds to the last physical position 1202 that was obscured. As noted above, the obscuring process may be cancelled after reaching the physical position 1006 in the indicator, and a second indicator of the last physical position 1202 that was obscured may be stored on at least one of the magnetic medium and a memory coupled thereto, according to another approach. In yet another approach, also noted above, the indicator and the second indicator may be read, such that the obscuring process may restart from the physical position 1202 indicated in the second indicator and terminate upon reaching the physical position 1006 in the indicator.

In another embodiment depicted in FIG. 13, the data track may include a second physical position 1302 on the track that corresponds to a beginning of the encrypted data 1002 written over residual unencrypted data 1304. As discussed above, the second indicator of the second physical position 1302 may be stored on at least one of the magnetic medium and the memory coupled thereto, according to one approach.

In one embodiment, the residual unencrypted 1304 data may be part of the same data set as that discussed above (1004). In yet another embodiment the residual unencrypted data 1304 may be a different unencrypted data set.

In another embodiment, the second physical position 1302 on the magnetic medium may correspond to the end of the un-overwritten portion of the unencrypted data 1306 adjacent the beginning of the encrypted data 1002.

As also discussed above, the encrypted data 1002 may not be overwritten, whereas the unencrypted data 1306 positioned before the second physical position 1302 and the unencrypted data 1304 positioned after the physical position 1006 may be obscured, according to another approach.

Additionally, in one embodiment, alternating usages of the magnetic medium may use encrypted and unencrypted formats such that the magnetic medium may have a plurality of alternating encrypted and unencrypted regions. Accordingly, in one approach, the data track may include a plurality of indicators of physical positions corresponding to the beginning encrypted data written over residual unencrypted data and a plurality of indicators of physical positions corresponding the end of encrypted data written over residual unencrypted data.

It will be clear that the various features of the foregoing methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a processor and logic integrated with and/or executable by the processor, the logic being configured to:
   determine a first physical position on a magnetic medium that corresponds to an end of at least one encrypted data set;
   store an indicator of the first physical position on at least one of the magnetic medium and a memory coupled thereto;
   cause obscuring of at least one unencrypted data set positioned after the first physical position without overwriting the encrypted data set;
   wherein, in response to the obscuring of the unencrypted data set being cancelled and/or interrupted prior to an entirety thereof being obscured, the logic is configured to: determine a second physical position on the magnetic medium that corresponds to an end of the obscured portion of the unencrypted data set, and store an indicator of the second physical position on at least one of the magnetic medium and the memory coupled thereto; and
   wherein, in response to the obscuring of the unencrypted data set being resumed, the logic is configured to: cause obscuring of remaining portions of the unencrypted data set positioned after the second physical position.

2. The system as recited in claim 1, wherein the obscuring of the unencrypted data set includes overwriting the unencrypted data set.

3. The system as recited in claim 1, wherein the encrypted data set includes encrypted data written over residual unencrypted data, and wherein the logic is further configured to cause obscuring and/or disablement of decryption data associated with the encrypted data written over residual unencrypted data.

4. The system as recited in claim 1, wherein the encrypted data set includes residual encrypted data, the residual encrypted data being associated with decryption data that has been previously obscured and/or disabled.

5. The system as recited in claim 1, wherein the logic is configured to:
   determine a third physical position on the magnetic medium that corresponds to a beginning of the encrypted data set; and
   store an indicator of the third physical position on at least one of the magnetic medium and the memory coupled thereto.

6. The system as recited in claim 5, wherein the logic is configured to cause obscuring of at least one unencrypted data set positioned before the third physical position without overwriting the encrypted data set.

7. The system as recited in claim 5, wherein the logic is configured to:
   determine a fourth physical position on the magnetic medium that corresponds to an end of a second encrypted data set, the second encrypted data set being positioned before the encrypted data set;
   determine a fifth physical position on the magnetic medium that corresponds to a beginning of the second encrypted data set; and
   store an indicator of the fourth physical position and an indicator of the fifth physical position on the at least one of the magnetic medium and the memory coupled thereto.

8. The system as recited in claim 7, wherein the logic is configured to not cause overwriting of the second encrypted data set.

9. A method, comprising:
- determining a first physical position on a magnetic medium that corresponds to an end of at least one encrypted data set;
- storing an indicator of the first physical position on at least one of the magnetic medium and a memory coupled thereto; and
- causing obscuring of at least one unencrypted data set positioned after the first physical position without overwriting the encrypted data set;
- wherein, in response to the obscuring of the unencrypted data set being cancelled and/or interrupted prior to an entirety thereof being obscured, the logic is configured to: determine a second physical position on the magnetic medium that corresponds to an end of the obscured portion of the unencrypted data set, and store an indicator of the second physical position on at least one of the magnetic medium and the memory coupled thereto; and
- wherein, in response to the obscuring of the unencrypted data set being resumed, the logic is configured to: cause obscuring of remaining portions of the unencrypted data set positioned after the second physical position.

10. The method as recited in claim 9, further comprising:
- for each encrypted data set on the magnetic medium, determining a physical position on the magnetic medium that corresponds to a beginning and an end of the encrypted data set, and storing the physical position on at least one of the magnetic medium and the memory coupled thereto; and
- causing obscuring of each unencrypted data set without overwriting any of the encrypted data sets.

11. The method as recited in claim 10, wherein at least one of the encrypted data sets includes encrypted data written over residual unencrypted data; and
- wherein the method further comprises causing obscuring and/or disablement of decryption data associated with the encrypted data written over residual unencrypted data.

12. The method as recited in claim 10, wherein at least one of the encrypted data sets set includes encrypted data written over residual unencrypted data.

13. A computer program product, comprising:
- a non-transitory computer readable storage medium having program instructions embodied therewith, the program instructions readable and/or executable by a processor to cause the processor to:
    - read an indicator of a first physical position on a magnetic medium that corresponds to an end of at least one encrypted data set; and
    - cause obscuring of at least one unencrypted data set positioned after the first physical position without overwriting the encrypted data set,
- wherein, in response to the obscuring of the unencrypted data set being cancelled and/or interrupted prior to an entirety thereof being obscured, the program instructions are readable and/or executable by the processor to cause the processor to:
    - read a second physical position on the magnetic medium that corresponds to an end of the obscured portion of the encrypted data set, and
    - cause obscuring of remaining portions of the unencrypted data set positioned after the second physical position when obscuring of the unencrypted data set is resumed.

14. The computer program product as recited in claim 13, wherein the program instructions are readable and/or executable by the processor to cause the processor to cause obscuring of at least one unencrypted data set positioned before the encrypted data set.

15. The computer program product as recited in claim 13, wherein the encrypted data set includes encrypted data written over residual unencrypted data, and wherein the program instructions are readable and/or executable by the processor to cause the processor to cause obscuring and/or disablement of decryption data associated with the encrypted data written over residual unencrypted data.

16. The computer program product as recited in claim 15, wherein the encrypted data set includes residual encrypted data, the residual encrypted data being is associated with decryption data that has been previously obscured and/or disabled.

17. The computer program product as recited in claim 13, wherein the magnetic medium includes alternating encrypted and unencrypted data sets; wherein the program instructions are readable and/or executable by a processor to cause the processor to:
- read a physical position on the magnetic medium that corresponds to a beginning and an end of each encrypted data set; and
- cause obscuring of each unencrypted data set without overwriting any of the encrypted data sets.

* * * * *